United States Patent
Jung et al.

(10) Patent No.: US 9,692,082 B2
(45) Date of Patent: Jun. 27, 2017

(54) ELECTRODE ASSEMBLY AND MANUFACTURING METHOD THEREOF

(71) Applicant: LG CHEM, LTD., Seoul (KR)

(72) Inventors: Ah Reum Jung, Daejeon (KR); Ji Won Park, Daejeon (KR); Chang Bum Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 70 days.

(21) Appl. No.: 14/416,590

(22) PCT Filed: Feb. 17, 2014

(86) PCT No.: PCT/KR2014/001253
§ 371 (c)(1),
(2) Date: Jan. 22, 2015

(87) PCT Pub. No.: WO2014/126427
PCT Pub. Date: Aug. 21, 2014

(65) Prior Publication Data
US 2015/0180082 A1 Jun. 25, 2015

(30) Foreign Application Priority Data

Feb. 15, 2013 (KR) .................. 10-2013-0016515
Feb. 17, 2014 (KR) .................. 10-2014-0017628

(51) Int. Cl.
*H01M 10/0583* (2010.01)
*H01M 10/04* (2006.01)
*H01M 10/052* (2010.01)

(52) U.S. Cl.
CPC ... *H01M 10/0431* (2013.01); *H01M 10/0459* (2013.01); *H01M 10/052* (2013.01);
(Continued)

(58) Field of Classification Search
CPC ......... H01M 10/0431; H01M 10/0459; H01M 10/0583
See application file for complete search history.

(56) References Cited

U.S. PATENT DOCUMENTS 6,726,733 B2 * 4/2004 Lee .................. H01M 2/1686
29/623.3
7,384,705 B2 6/2008 Kezuka et al.
(Continued)

FOREIGN PATENT DOCUMENTS

CN 1313643 A 9/2001
CN 1212687 C 7/2005
(Continued)

OTHER PUBLICATIONS

Extended European Search Report for European Application No. 14751695.9, dated Jul. 23, 2015.

*Primary Examiner* — Ula C Ruddock
*Assistant Examiner* — Thomas Parsons
(74) *Attorney, Agent, or Firm* — Birch, Stewart, Kolasch & Birch, LLP (57) ABSTRACT

An electrode assembly includes at least one first unit cell obtained by stacking a first electrode, a separator, a second electrode, a separator and a first electrode one by one, and at least one second unit cell obtained by stacking a second electrode, a separator, a first electrode, a separator and a second electrode one by one. The first unit cell and the second unit cell are alternately and repeatedly disposed between a separator sheet folded in zigzags.

17 Claims, 9 Drawing Sheets

(52) U.S. Cl.
CPC .... *H01M 10/0583* (2013.01); *H01M 2220/20* (2013.01); *Y02E 60/122* (2013.01); *Y02P 70/54* (2015.11); *Y02T 10/7011* (2013.01); *Y10T 29/41* (2015.01)

(56) References Cited

U.S. PATENT DOCUMENTS

| | | | |
|---|---|---|---|
| 2001/0019797 | A1 | 9/2001 | Kezuka |
| 2002/0160258 | A1 | 10/2002 | Lee et al. |
| 2007/0218355 | A1* | 9/2007 | Ryu ............... H01M 10/052 429/152 |
| 2007/0254199 | A1 | 11/2007 | Shu et al. |
| 2008/0044689 | A1 | 2/2008 | Shu et al. |
| 2008/0280208 | A1* | 11/2008 | Naoi ............... H01M 10/0431 429/247 |
| 2010/0279161 | A1 | 11/2010 | Kang et al. |
| 2011/0183183 | A1 | 7/2011 | Grady et al. |
| 2012/0015236 | A1 | 1/2012 | Spare |
| 2012/0225345 | A1 | 9/2012 | Kim |
| 2013/0266841 | A1 | 10/2013 | Ryu et al. |
| 2015/0200418 | A1 | 7/2015 | Grady et al. |

FOREIGN PATENT DOCUMENTS

| | | | |
|---|---|---|---|
| CN | 101304104 | A | 11/2008 |
| CN | 102884665 | A | 1/2013 |
| EP | 2750221 | A1 | 7/2014 |
| JP | 2003-523061 | A | 7/2003 |
| JP | 2009-530766 | A | 8/2009 |
| KR | 2000-0051741 | A | 8/2000 |
| KR | 2003-0066960 | A | 8/2003 |
| KR | 10-2009-0003823 | A | 1/2009 |
| KR | 10-2012-0117306 | A | 10/2012 |
| KR | 1020120117306 | * | 10/2012 |
| TW | 499767 | B | 8/2002 |
| TW | 200743245 | A | 11/2007 |
| TW | 200812138 | A | 3/2008 |
| TW | I344234 | B | 6/2011 |
| WO | WO 2006/025662 | A1 | 3/2006 |
| WO | WO 2008/002024 | A1 | 1/2008 |
| WO | WO 2011/094286 | A2 | 8/2011 |
| WO | WO 2013/157743 | A1 | 10/2013 |
| WO | WO 2013/180482 | A1 | 12/2013 |

* cited by examiner

ELECTRODE ASSEMBLY AND MANUFACTURING METHOD THEREOF

FIELD OF THE INVENTION

The present invention relates to an electrode assembly in which a cathode and an anode are stacked by a Z-folding method and a manufacturing method thereof, and more particularly, to an electrode assembly in which first unit cells of cathode/separator/anode/separator/cathode and second unit cells of anode/separator/cathode/separator/anode are alternately stacked, and a manufacturing method thereof.

BACKGROUND OF THE ART

A secondary battery receives much attention as a power source of an electric vehicle (EV), a hybrid electric vehicle (HEV), a parallel hybrid electric vehicle (PHEV), etc., suggested as a means for solving the air pollution, etc. of a common gasoline vehicle, a diesel vehicle, etc. using a fossil fuel. In a medium and large size device such as a vehicle, high power and high capacity are necessary, and a medium and large size battery module in which a plurality of battery cells are electrically connected is used.

However, since the medium and large size battery module is preferably manufactured to have a small size and light weight, a polygonal battery, a pouch shape battery, etc. having high stacking degree and light weight when considering capacity are mainly manufactured as the battery cell of the medium and large size battery module.

Figure 1:
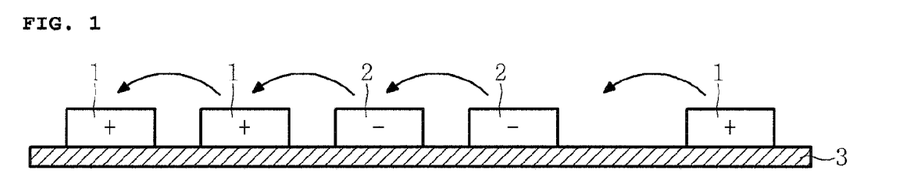
FIG. 1 is a conceptual diagram of folding of a common electrode assembly.

In general, an electrode assembly includes a stacked structure of cathode/separator/anode and is manufactured by arranging a plurality of cathodes 1 and anodes 2 on a separator sheet 3 as shown in FIG. 1, and wrapping from one terminal portion of the separator sheet 3 (for example, from the cathode 1 at the rightmost in FIG. 1) sequentially counterclockwise. However, in this structure, temperature gradient may be generated between an electrode at the center portion and an electrode at the outer portion, thereby generating different heat emitting efficiencies. Thus, lifetime may decrease after use for a long time.

Figure 2:
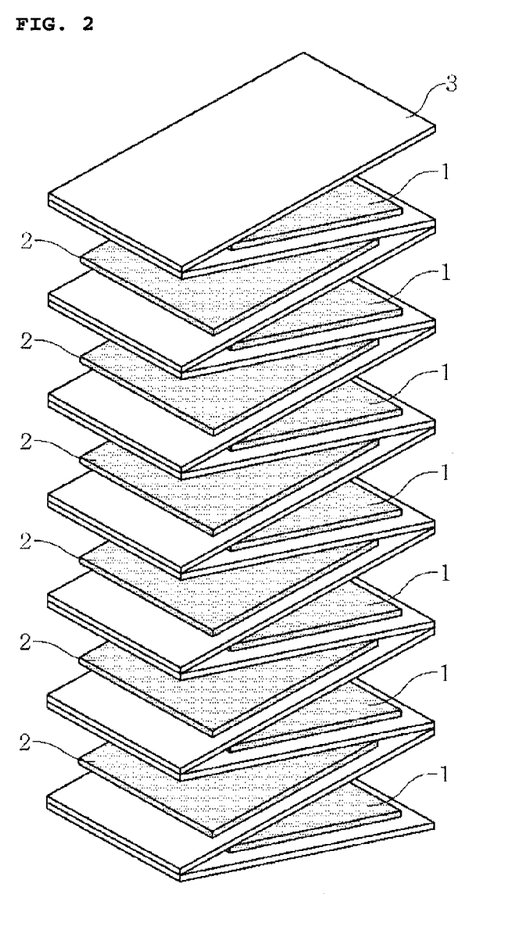
FIG. 2 is a conceptual diagram illustrating a folded structure of a common electrode assembly.

Alternatively, as shown in FIG. 2, an electrode assembly is composed of alternately stacked cathodes 1 and anodes 2 with a separator sheet 3 therebetween in zigzags. This method (referred to as a Z-folding method) is disclosed in Korean Publication Patent No. 2000-0051741.

According to the above described method of manufacturing an electrode assembly, a cathode and an anode are stacked one by one, and a process for the completion of one electrode assembly is time-consuming. Thus, the productivity of an electrode assembly is markedly lowered. In addition, as the number of electrodes necessary for a secondary battery increases, the generation of defects concerning position alignment between cathodes and anodes during folding may markedly increase. Further, a folding equipment is required to increase in line with the production capacity of the electrode assembly, and so, manufacturing costs may increase. Thus, developments on an electrode assembly having improved productivity and good position alignment between cathodes and anodes, and a manufacturing method thereof are necessary.

PRIOR ART

Patent Document (Patent Document 1) Korean Publication Patent No. 2000-0051741

SUMMARY OF THE INVENTION

An aspect of the present invention provides an electrode assembly in which a first unit cell having the structure of cathode/separator/anode/separator and a second unit cell having the structure of anode/separator/cathode/separator/anode are manufactured, and the first unit cells and the second unit cells are alternately stacked by a Z-folding method, to solve the above-described defects, and a manufacturing method thereof by which a manufacturing process may be simplified. and the reduction of manufacturing costs may be maximized.

According to an aspect of the present invention, there is provided an electrode assembly including at least one first unit cell obtained by stacking a first electrode, a separator, a second electrode, a separator and a first electrode one by one, and at least one second unit cell obtained by stacking a second electrode, a separator, a first electrode, a separator and a second electrode one by one. The first unit cell and the second unit cell are alternately and repeatedly disposed between a separator sheet folded in zigzags.

In an embodiment, the first electrode may be a cathode, and the second electrode may be an anode. Alternatively, the first electrode may be an anode, and the second electrode may be a cathode.

In addition, the first unit cell and the second unit cell may have a combined structure of the electrode and the separator into one body by heat and pressure. In addition, heat and pressure may be applied to the electrode assembly.

Further, an active material may be coated only on one side of the first electrode or the second electrode, facing an inner portion of the electrode assembly. The first electrode and the second electrode may be disposed respectively at the outermost portions of both terminal portions of the electrode assembly.

The first unit cell may further include at least one first additional unit cell obtained by stacking a separator, a second electrode, a separator and a first electrode, and the second unit cell may further include at least one second additional unit cell obtained by stacking a separator, a first electrode, a separator and a second electrode.

In addition, in the electrode assembly according to the present invention, a plurality of the first unit cells may be prepared and may be divided into at least two groups having different sizes, and a plurality of the second unit cells may be prepared and may be divided into at least two groups having different sizes. The separator sheet may have different folded lengths in zigzags according to the size of the first unit cell and the size of the second unit cell.

The first unit cell and the second unit cell may be alternately disposed according to the size with the separator sheet therebetween. The electrode assembly may have a step shape.

At least one of the plurality of the first unit cells may further include a first additional unit cell obtained by stacking a separator, a second electrode, a separator and a first electrode, and at least one of the plurality of the second unit cells may further include a second additional unit cell obtained by stacking a separator, a first electrode, a separator and a second electrode. The separator sheet may have different folded heights in zigzags according to the height of the first unit cell and the height of the second unit cell.

The first unit cell and the second unit cell may be alternately disposed according to the height with the separator sheet therebetween.

According to another aspect of the present invention, there is provided a manufacturing method of an electrode assembly including forming at least one first unit cell obtained by stacking a first electrode, a separator, a second electrode, a separator and a first electrode one by one, forming at least one second unit cell obtained by stacking a second electrode, a separator, a first electrode, a separator and a second electrode one by one, and forming the electrode assembly by alternately and repeatedly disposing the first unit cell and the second unit cell between a separator sheet folded in zigzags.

Preferably, the forming of the electrode assembly may include disposing at least one of the first unit cells with a certain distance on one side of the separator sheet, and disposing at least one of the second unit cells with the certain distance on the other side of the separator sheet, so that the second unit cell may be positioned between the first unit cells, and folding the separator sheet in zigzags.

Alternatively, the forming of the electrode assembly may include disposing at least one of the first unit cells with a certain distance on one side of the separator sheet, and disposing at least one of the second unit cells with the certain distance on the other side of the separator sheet, so that the second unit cell may be positioned at the same position as the first unit cell, and folding the separator sheet in zigzags.

In addition, the manufacturing method of an electrode assembly of the present invention may further include pressurizing and compressing both folded portions of the separator sheet.

A plurality of the first unit cells may be prepared and may be divided into at least two groups having different sizes, and a plurality of the second unit cells may be prepared and may be divided into at least two groups having different sizes, and the folded lengths of the separator sheet in zigzags may be different according to the size of the first unit cell and the size of the second unit cell in the forming of the electrode assembly.

The first unit cell and the second unit cell may be alternately disposed according to the size with the separator sheet therebetween.

The electrode assembly manufactured by the manufacturing method of the electrode assembly may have a step shape.

At least one of the plurality of the first unit cells may further include a first additional unit cell obtained by stacking a separator, a second electrode, a separator and a first electrode, and at least one of the plurality of the second unit cells may further include a second additional unit cell obtained by stacking a separator, a first electrode, a separator and a second electrode. In addition, folded heights of the separator sheet in zigzags may be different according to the height of the first unit cell and the height of the second unit cell in the forming of the electrode assembly.

The first unit cell and the second unit cell may be alternately disposed according to the height with the separator sheet therebetween.

Effect of the Invention

According to the present invention, a folding process may be simplified, and the reduction effect of manufacturing costs may be obtained by using a first unit cell and a second unit cell in the folding process.

In addition, an active material is coated only on one side facing an inner side, of a first electrode or a second electrode respectively disposed at the outermost portions at both terminals of an electrode assembly according to the present invention, and a reduction effect of manufacturing costs may be obtained.

In addition, since the cross-section of an electrode assembly according to the present invention may have a step shape other than a square, the degree of freedom of designing a peripheral equipment on which the electrode assembly is installed, and an available space in the equipment on which the electrode assembly is installed may be efficiently used.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. In the description taken in conjunction with the accompanying drawings, the same reference numerals are given to the same elements irrespective of the drawings, and repeated explanation thereon will be omitted. It will be understood that, although the terms first, second, etc. may be used herein to describe various elements, these elements should not be limited by these terms. These terms are only used to distinguish one element from another element.

Electrode Assembly

Figure 3:
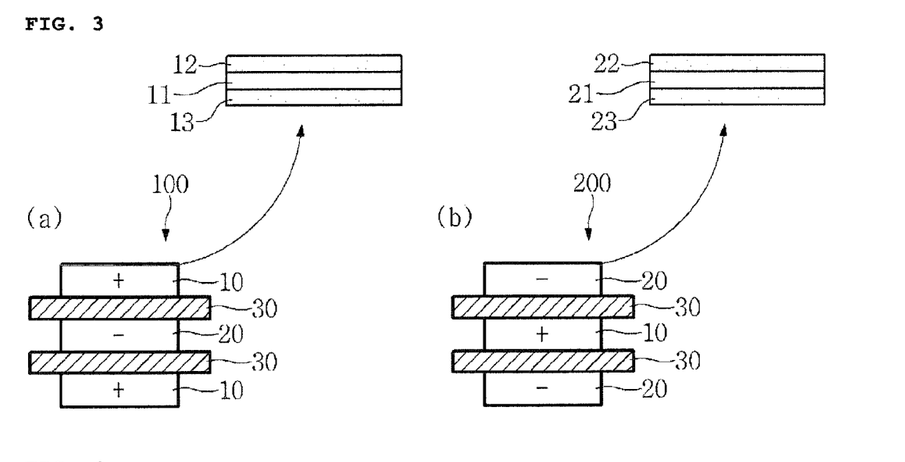
FIGS. 3A and 3B illustrate structures of a first unit cell and a second unit cell according to an embodiment of the present invention.
Figure 4:
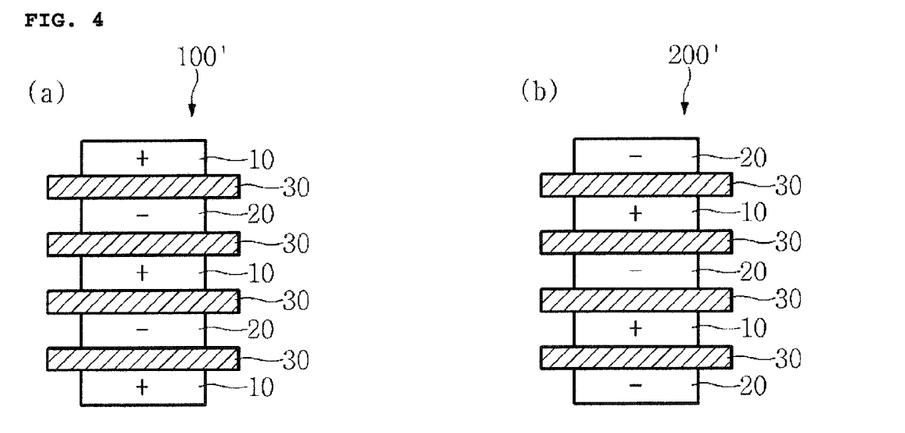
FIGS. 4A and 4B illustrate structures of a first unit cell and a second unit cell according to another embodiment of the present invention.

Referring to FIGS. 3 and 4, a first unit cell 100 and a second unit cell 200 according to the present invention are illustrated. The first unit cell 100 is formed by stacking a first electrode 10, a separator 30, a second electrode 20, a separator 30 and a first electrode 10 one by one. In this exemplary embodiment, the first electrode 10 is a cathode 10, and the second electrode 20 is an anode 20. However, on the contrary to this, the first electrode 10 may be the anode, and the second electrode 20 may be the cathode. In addition, the second unit cell 200 is formed by stacking an anode 20, a separator 30, a cathode 10, a separator 30 and an anode 20 one by one. That is, the cathodes 10 are disposed at both terminals of the first unit cell 100, and the anodes 20 are disposed at both terminals of the second unit cell 200.

In addition, as shown in FIG. 4, the first unit cell 100' may further include a separator 30, an anode 20, a separator 30 and a cathode 10 stacked one by one. The separator 30, the anode 20, the separator 30 and the cathode 10 added may be one unit (a first additional unit cell), and the first unit cell may be formed so that a plurality of the first additional unit cells may be further stacked. In the case when the first additional unit cell is additionally stacked, the same anodes 10 may be disposed at both terminals of the first unit cell. Similarly, the separator 30, the cathode 10, the separator 30 and the anode 20 may be one unit (a second additional unit cell), and the second unit cell 200' may be formed so that a plurality of the second additional unit cells may be further stacked. The addition of the first additional unit cell and the second additional unit cell may be determined according to battery capacity. At last, an odd number of electrodes (2n+1, where n is an integer) are present in the first unit cell and the second unit cell, and the same electrodes (cathodes or anodes) are disposed at both terminals of each unit cell.

Referring to FIG. 3, the cathode 10 may be realized to have a structure including cathode active materials 12 and 13 coated on both sides of a cathode current collector 11. In addition, the anode 20 may be realized to have a structure including anode active materials 22 and 23 coated on both sides of an anode current collector 21. As described subsequently, the active material may be coated only on one side facing the inner portion, of the cathode 10 or the anode 20, respectively disposed at both terminal portions of the electrode assembly. For example, in the case when the first unit cell 100 is disposed at the lowermost terminal of the electrode assembly, the cathode 10 may be disposed at the lowermost terminal of the electrode assembly. In this case, the active materials 12 and 13 are not necessary to be coated on one side of the cathode 10 (a side not facing the anode, that is, a side facing the lowermost terminal of the electrode assembly). Thus, the amount coated of the cathode active material may decrease and a cost reduction effect would be obtained. In addition, in the case when the second unit cell 200 is disposed at the uppermost terminal of the electrode assembly, the anode 20 may be disposed at the uppermost terminal of the electrode assembly. In this case, the active materials 22 and 23 are not necessary to be coated on one side of the anode 20 (a side not facing the cathode, that is, a side facing the uppermost terminal of the electrode assembly). Thus, the amount coated of the anode active material may decrease and a cost reduction effect would be obtained.

Figure 5:
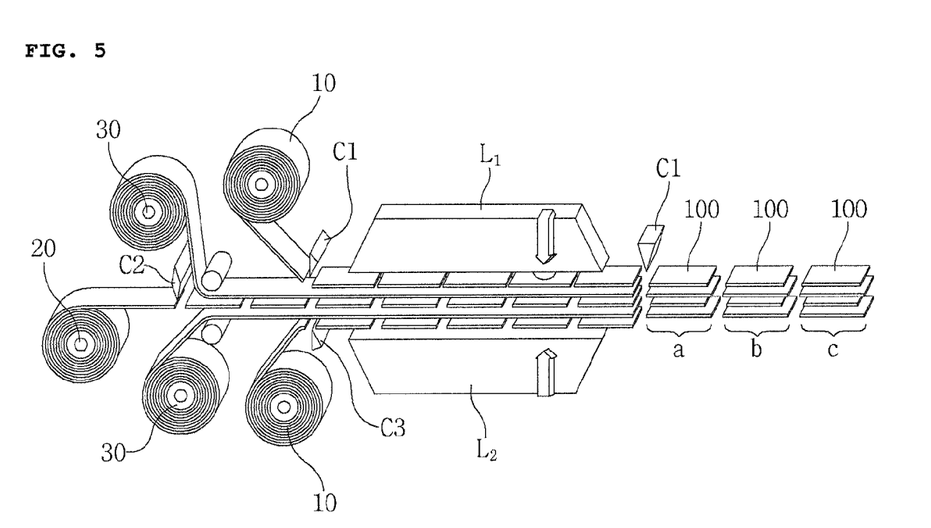
FIG. 5 is a conceptual diagram of a manufacturing process of a first unit cell according to the present invention.

Referring to FIG. 5, a manufacturing process of a first unit cell 100 will be explained. First, a cathode 10, a separator 30, an anode 20, a separator 30 and a cathode 10 are disposed above and below in order before entering laminators L1 and L2. Two cathodes 10 and an anode 20 may be cut into an appropriate size before entering the laminators L1 and L2 by using cutters C1, C2 and C3. In this case, the two cathodes 10 and the anode 20 are arranged above and below and disposed so as to enter the laminators L1 and L2. Of course, the two cathodes 10 and the anode 20 may be supplied without performing the cutting in this process.

Then, a structure obtained by attaching three electrodes and two separators by heat and pressure in the laminators L1 and L2 may produce the first unit cell 100 as a radical cell. Through cutting using a cutter C4, the first unit cell 100 is completed, and additional inspection processes such as a thickness inspection (a), a vision inspection (b), a short inspection (c), etc. may be additionally performed. After passing through the laminators L1 and L2, pores between the separator 30 and the cathode 10 and the anode 20 may decrease, thereby obtaining an improving effect of the performance of the first unit cell 100. The second unit cell 200 may also be manufactured through the same manufacturing process.

Figure 6:
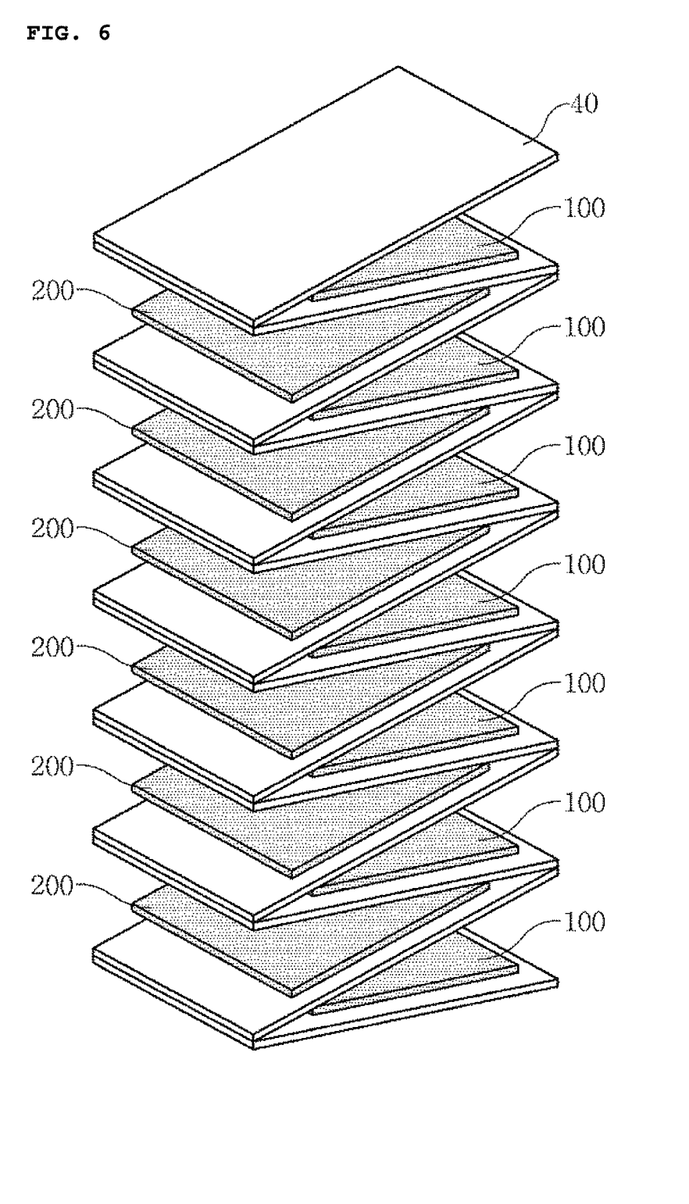
FIG. 6 illustrates a structure of an electrode assembly according to the first embodiment of the present invention.

The electrode assembly according to the first embodiment of the present invention is formed by alternately disposing and repeatedly stacking the first unit cells 100 and the second unit cells 200 manufactured through the unit cell manufacturing process between the separator sheet 40 folded in zigzags. Referring to FIG. 6, a plurality of the first unit cells 100 and a plurality of the second unit cells 200 are found to be alternately stacked while interposing the separator sheet 40 therebetween. Different from the alternate stacking of the cathode and the anode in a common Z-folding method, the first unit cells 100 and the second unit cells 200 are stacked. Thus, the time consumed for the folding process may be reduced. In addition, since the cathode and the anode are aligned and stacked in each of the unit cells, the generation of defects due to the position alignment between the cathodes and the anodes during folding may be markedly reduced.

Figure 7:
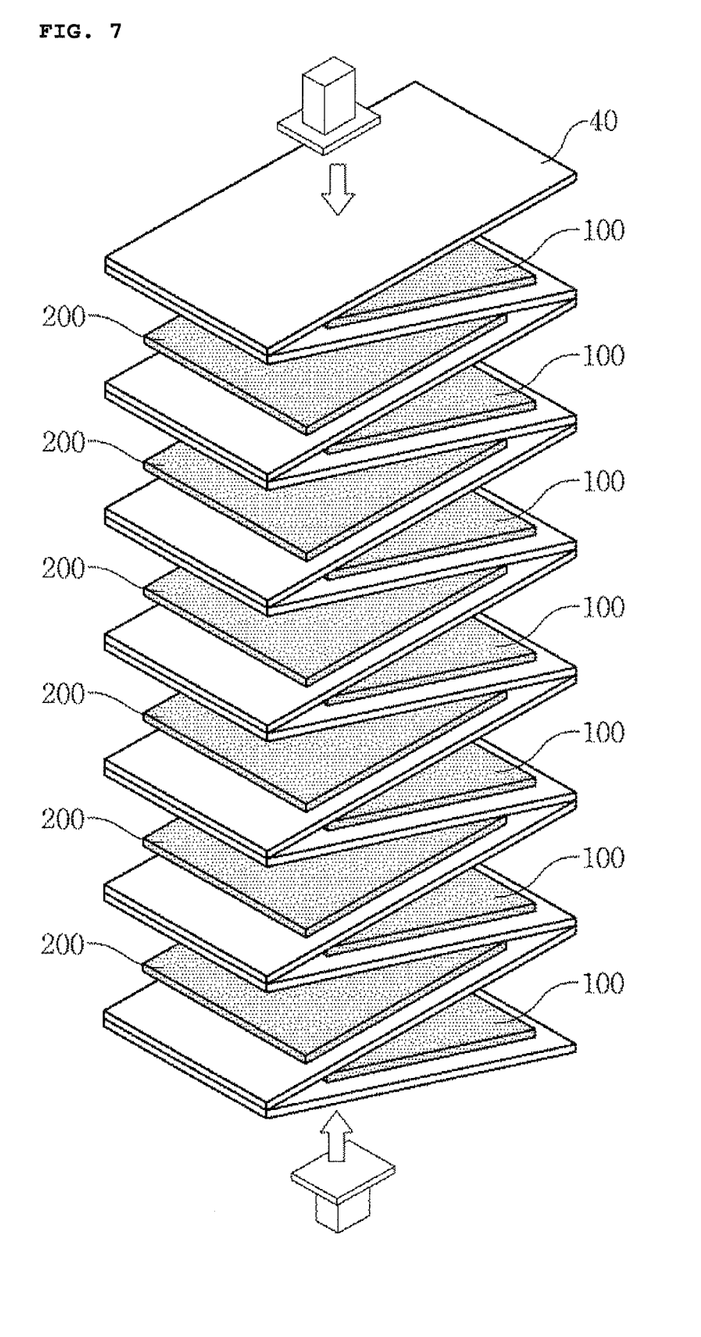
FIG. 7 illustrates the compression of an electrode assembly according to the present invention.

Referring to FIG. 7, a compression process of the upper portion and the lower portion of the electrode assembly may be additionally conducted. Through the compression process, the pore between the separator sheet 40 and the unit cells 100 and 200 may decrease, and the improving effect of the performance of the electrode assembly may be obtained.

Figure 8:
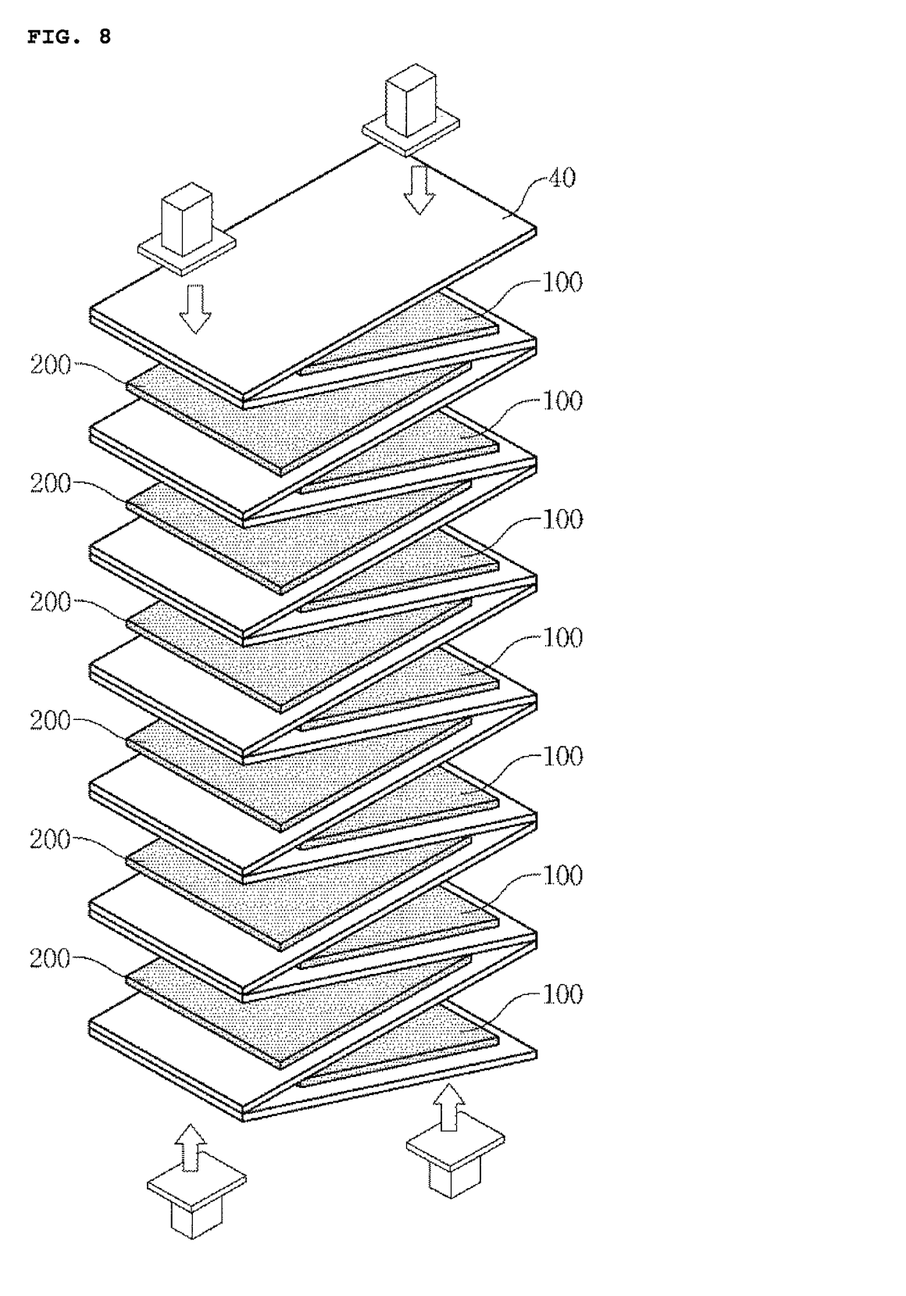
FIG. 8 illustrates the compression with respect to both folded portions of a separator sheet of an electrode assembly according to the present invention.

In addition, referring to FIG. 8, both folded portions of the separator sheet 40 of the electrode assembly are press compressed upward and downward, respectively, to simply seal the sides of the electrode assembly. Through the above-described process, the treatment of both folded portions of the separator sheet 40 may be simply conducted, and clear finishing by appearance may be attained. Meanwhile, the treatment of both folded portions of the separator sheet 40 may be conducted by using other compression or welding apparatus other than the press.

Figure 11:
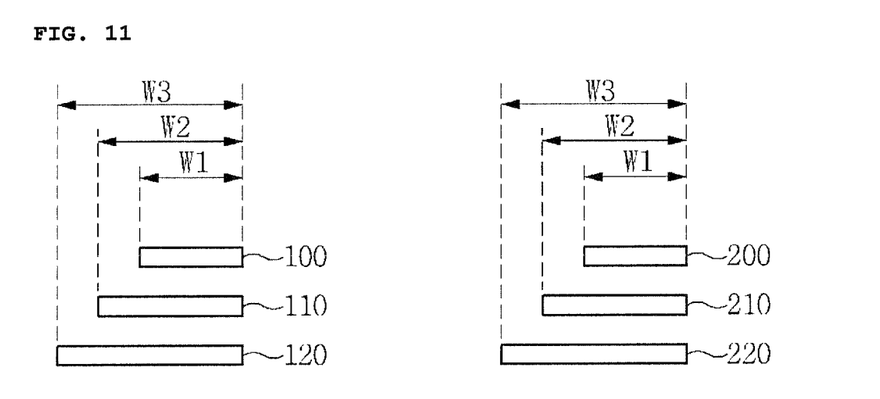
FIG. 11 illustrates first unit cells and second unit cells of an electrode assembly by the size according to the present invention.

The electrode assembly according to the second embodiment of the present invention is characterized in having a step shape (an expression used to refer to a shape having a step in the present application). A plurality of the first unit cells 100 is prepared and is divided into at least two groups having different sizes, and a plurality of the second unit cells 200 is prepared and is divided into at least two groups having different sizes. A plurality of the first unit cells 100 of a first group having the size of w1 (width, length, or the like) may be present, a plurality of the first unit cells 110 of a second group having the size of w2 may be present, and a plurality of the first unit cells 120 of a third group having the size of w3 may be present. In FIG. 11, three groups having the sizes of w1 to w3 are illustrated, and each group includes one of the first unit cells. However, the number of the groups of the first unit cell having different sizes is not limited, and the number of the first unit cells included in each of the groups is not limited. The same conditions are applied to the second unit cells 200, 210 and 220.

Figure 13:
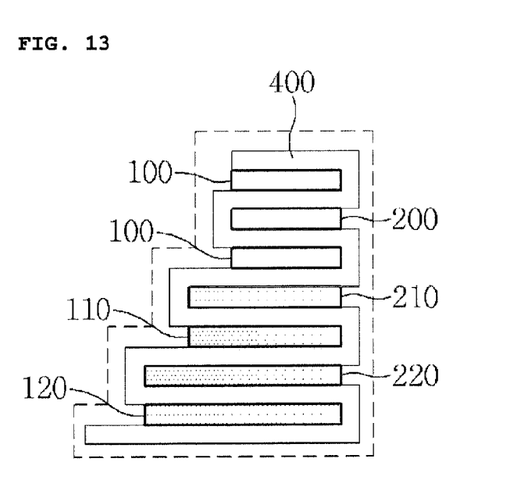
FIG. 13 is an exemplary cross-sectional view of an electrode assembly according to the second embodiment of the present invention.

As shown in FIG. 11, an electrode assembly of a step shape having four layers as shown in FIG. 13 may be formed by using the first unit cells and the second unit cells having three sizes w1 to w3. In FIG. 13, the first unit cells 100, 110 and 120 and the second unit cells 200, 210 and 220 are stacked according to the size to form the electrode assembly of the step shape; however, various shapes may be formed without limitation. For example, a step electrode assembly having a diamond shape may be formed by stacking the first unit cell 100 having the size of w1, the second unit cell 210 having the size of w2, and the first unit cell 100 having the size of w1.

In addition, the height of each layer of the step shape may be different by stacking a plurality of the first unit cells and the second unit cells having the same size. That is, electrode assemblies having various shapes may be manufactured by changing the number of the groups of the first unit cell and the second unit cell and the number in each group and by changing the arrangement order according to the size.

Figure 12:
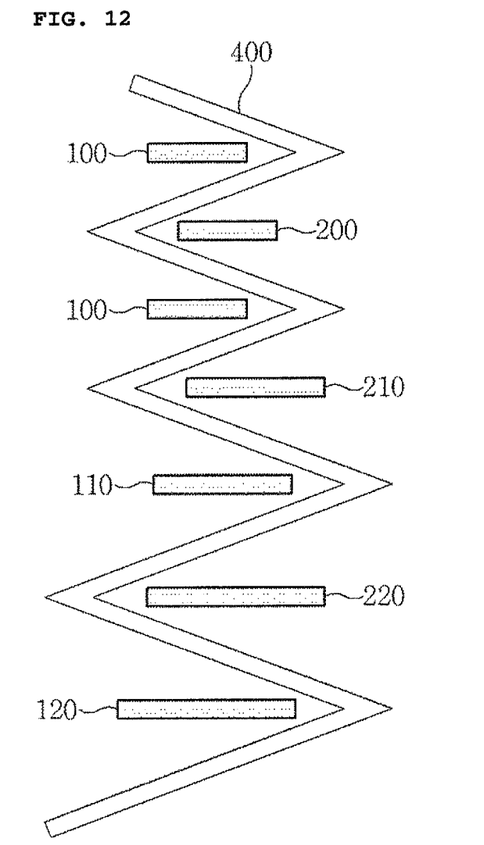
FIG. 12 illustrates a structure of an electrode assembly according to the second embodiment of the present invention.

Referring to FIG. 12, the folded length of the separator sheet 400 in zigzags may be different according to the sizes w1, w2 and w3 of the first unit cells 100, 110 and 120, and the sizes w1, w2 and w3 of the second unit cells 200, 210 and 220. For example, the first unit cell 100 having the size of w1 is stacked on the separator sheet 400, the separator sheet 400 is folded to leftward and stacked on the first unit cell 100, the second unit cell 210 having the size of w2 is stacked on the separator sheet 400, and the separator sheet 400 is folded again to rightward and stacked on the second unit cell 220. When the separator sheet 400 is folded in zigzags in this way, the length of the separator sheet 400 folded to cover the first unit cell 100 having the size of w1 and the length of the separator sheet 400 folded to cover the second unit cell 210 having the size of w2 are different from each other. That is, according to the change of the size of the first unit cell and the second unit cell, the folded length of the separator sheet 400 may be changed.

The first unit cells 100, 110 and 120 and the second unit cells 200, 210 and 220 may be alternately disposed by the size with the separator sheet 400 therebetween. FIG. 13 is a cross-sectional view of an electrode assembly having a step shape when the unit cells are disposed by the size.

As illustrated in FIG. 13, when the cross-section of the electrode assembly has a step shape other than a square shape, the degree of freedom of designing a peripheral equipment on which the electrode assembly is installed may increase, and an available space in the equipment on which the electrode assembly is installed may be efficiently used.

Figure 14:
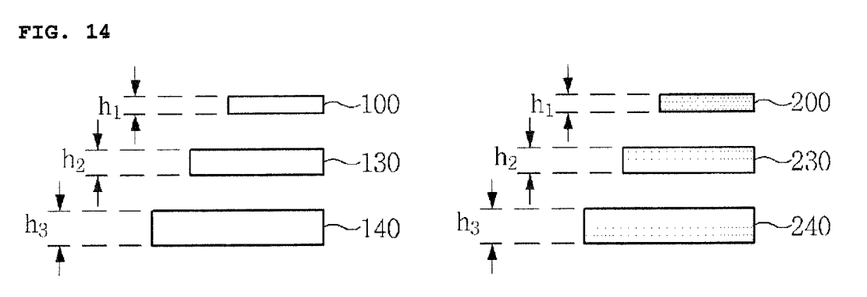
FIG. 14 illustrates first unit cells and second unit cells of an electrode assembly by the height according to the present invention.

The first unit cell 130 among the plurality of first unit cells may further include a first additional unit cell formed by stacking a separator, a second electrode, a separator and a first electrode as illustrated in FIG. 4. In addition, the first unit cell 140 among the plurality of first unit cells may further include two of the first additional unit cells. In this case, the heights of the first unit cells 100, 130 and 140 may satisfy h1<h2<h3 as illustrated in FIG. 14. Since the second unit cells 200, 230 and 240 also include one or two of the second additional unit cells formed by stacking a separator, a first electrode, a separator and a second electrode, a plurality of unit cells having different heights may be included. That is, the first unit cells 100, 130 and 140 and the second unit cells 200, 230 and 240 may include a plurality of unit cells having different sizes and heights. In FIG. 14, the first unit cells 100, 130 and 140 and the second unit cells 200, 230 and 240 are illustrated to have three different heights, however the present invention is not limited thereto.

The separator sheet 400 has different folded heights in zigzags according to the heights h1, h2 and h3 of the first unit cells 100, 130 and 140, and the heights h1, h2 and h3 of the second unit cells 200, 230 and 240. For example, the first unit cell 100 having the height of h1 is stacked on the separator sheet 400, the separator sheet 400 is folded to leftward and stacked on the first unit cell 130, the second unit cell 230 having the height of h2 is stacked on the separator sheet 400, and the separator sheet 400 is folded again to rightward and stacked on the second unit cell 240. When the separator sheet 400 is folded in zigzags in this way, the height of the separator sheet 400 folded to cover the first unit cell 100 having the height of h1 and the height of the separator sheet 400 folded to cover the second unit cell 230 having the height of h2 are different from each other. That is, according to the change of the height of the first unit cell and the second unit cell, the folded height of the separator sheet 400 may be changed.

The height of each step of a step shape may be different by alternately stacking a plurality of the first unit cells 100 and the second unit cells 200 having the size of w1, or the height of each step of the step shape may be different by alternately stacking the first unit cells 140 and the second unit cells 240 further including a plurality of the first additional unit cells and the second additional unit cells.

In addition, each of the first unit cells 100, 130 and 140 and the second unit cells 200, 230 and 240 may be alternately disposed on the separator sheet 400 according to the size.

Manufacturing Method of Electrode Assembly

A manufacturing method of an electrode assembly according to the present invention includes forming at least one first unit cell formed by stacking a first electrode, a separator, a second electrode, a separator and a first electrode one by one; forming at least one second unit cell formed by stacking a second electrode, a separator, a first electrode, a separator and a second electrode one by one; and forming the electrode assembly by alternately disposing the first unit cell and the second unit cell between a separator sheet folded in zigzags.

The structure of the electrode assembly described above may be included in the manufacturing method of the electrode assembly.

Figure 9:
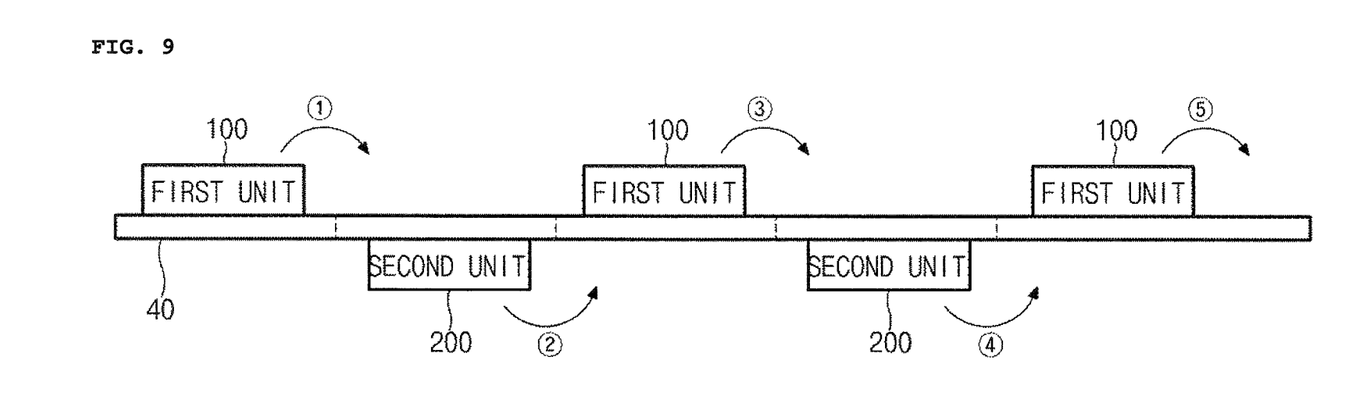
FIG. 9 illustrates a conceptual diagram of folding in a manufacturing method of an electrode assembly according to the present invention.

Referring to FIG. 9, the forming steps of the electrode assembly will be described in particular as follows. One or more of the first unit cells 100 are disposed with a certain distance on one side of the separator sheet 40. The second unit cells 200 are disposed with the same distance as the above distance on the other side of the separator sheet 40 which is the opposite side to the one side. In this case, the second unit cell 200 is disposed between the separated first unit cells 100. Then, the separator sheet 40 is folded from one terminal (the left portion in FIG. 9) of the separator sheet 40 clockwise (step ①), the folded separator sheet 40 is folded again counterclockwise (step ②), and the separator sheet 40 is folded clockwise and counterclockwise in zigzags (step ③ to ⑤), thereby manufacturing the electrode assembly as shown in FIG. 6.

Figure 10:
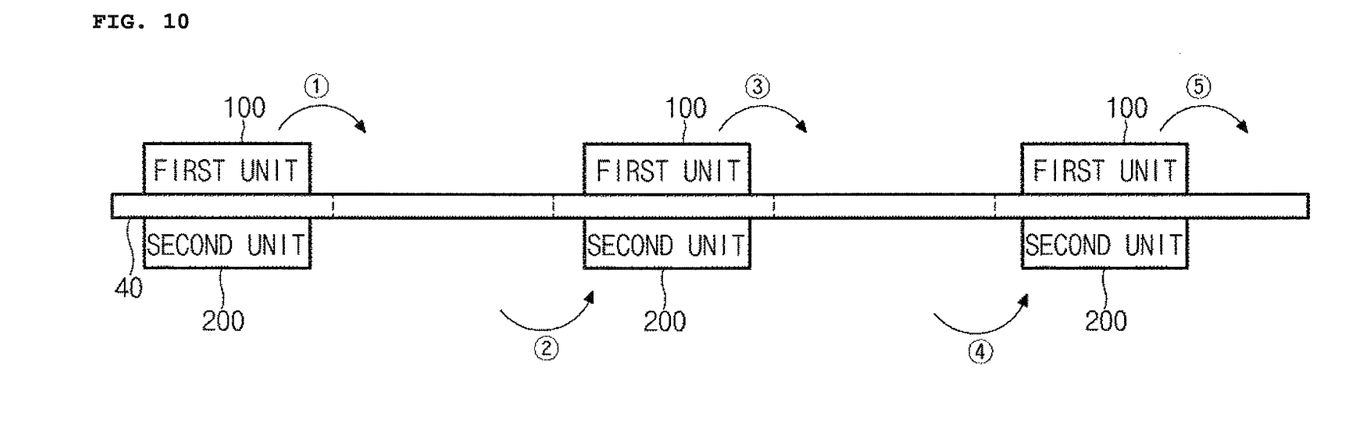
FIG. 10 illustrates another conceptual diagram of folding in a manufacturing method of an electrode assembly according to the present invention.

Referring to FIG. 10, the forming steps of the electrode assembly will be described in particular as follows. One or more of the first unit cells 100 are disposed with a certain distance on one side of the separator sheet 40. The second unit cells 200 are disposed at the same position as the first unit cells 100 on the other side of the separator sheet 40 which is the opposite side to the one side. Then, the separator sheet 40 is folded from one terminal of the separator sheet 40 (left portion in FIG. 9) clockwise (step ①), the folded separator sheet 40 is folded again counterclockwise (step ②), and the separator sheet 40 is folded clockwise and counterclockwise in zigzags (step ③ to ⑤), thereby manufacturing the electrode assembly as shown in FIG. 6.

The manufacturing method of the electrode assembly according to the present invention may further include a process of pressurizing and compressing both folded portions of the separator sheet 40. A press may be used for the pressurizing and compressing, however the present invention is not limited thereto. Through the process, the treatment of both folded portions of the separator sheet 40, formed during Z-folding may be simply conducted, and clear finishing by appearance may be realized.

Hereinafter, particular materials and constitutional characteristics of the constituent elements of the electrode assembly according to the present invention will be explained.

Cathode Structure

An electrode formed in the radical cell is classified into a cathode and an anode in the present invention. The radical cell is formed by combining the cathode and the anode with a separator interposed therebetween. The cathode may be manufactured, for example, by coating a mixture of a cathode active material, a conductive material and a binder on a cathode current collector, drying and pressing. A filler may be further included in the mixture as occasion demands. The cathode may be formed as a sheet shape so as to be applied in a process of installing on a loading roll.

[Cathode Current Collector]

The cathode current collector is generally manufactured to a thickness of about 3 to 500 μm. For the cathode current collector, a material not inducing the chemical change of a battery and having high conductivity may be used. For example, stainless steel, aluminum, nickel, titanium, baked carbon, a surface treated material of aluminum or stainless steel with carbon, nickel, titanium, silver, or the like may be used. However, the present invention is not limited thereto. To increase the adhesiveness of a cathode active material, minute embossing may be formed on the surface of the cathode current collector. In addition, the cathode current collector may have various shapes such as a film, a sheet, a foil, a net, a porous body, a foamed body, a non-woven fabric, and the like.

[Cathode Active Material]

The cathode active material for a lithium secondary battery may include, for example, a layered compound of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (where, x is 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$ etc.; Ni site-type lithium nickel oxide represented by the chemical formula of $LiNi_{1-x}M_xO_2$ (where, M=Co, Mn, Al, Cu, Fe, Mg, B or Ga, and x=0.01 to 0.3); lithium manganese complex oxide represented by the chemical formula of $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ in which a portion of Li is substituted with alkaline earth metal ions; a disulfide compound; $Fe_2(MoO_4)_3$, and the like. However, the present invention is not limited thereto.

Generally, the conductive material is added in the mixture including the cathode active material by 1 to 50 wt % based on the total amount of the mixture. The conductive material may include a material having conductivity without inducing the chemical change of a battery without limitation. For example, graphite such as natural graphite, synthetic graphite, etc.; carbon black such as carbon black, acetylene black, ketjen black, channel black, furnace black, lamp black, thermal black, etc.; conductive fiber such as carbon fiber, metal fiber, etc.; a metal powder such as a carbon fluoride powder, an aluminum powder, a nickel powder, etc.; conductive whisker such as zinc oxide, potassium titanate, etc.; conductive metal oxide such as titanium oxide, etc.; a conductive material such as polyphenylene derivatives, etc. may be used.

The binder is a component assisting the bonding of the active material with the conductive material and the bonding with the current collector, and is commonly included by about 1 to 50 wt % based on the total amount of the mixture including the cathode active material. Typical examples of the binder may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butylene rubber, fluorine rubber, various copolymers, etc.

The filler is a component restraining the expansion of the cathode and may be optionally used. A material not inducing the chemical change of a battery and having a fiber phase may be used without limitation. For example, an olefin-based polymer such as polyethylene, polypropylene, and the like; a fiber phase material such as a glass fiber, a carbon fiber, and the like may be used.

Anode Structure

An anode may be manufactured by coating an anode current collector with an anode active material, drying and pressing. A conductive material, a binder, a filler, etc. may be selectively included as occasion demands as described above. The anode may be formed as a sheet shape and may be applied in a process of installing on a loading roll.

[Anode Current Collector]

The anode current collector is generally manufactured to a thickness of about 3 to 500 μm. For the anode current collector, a material not inducing the chemical change of a battery and having conductivity may be used without limitation. For example, copper, stainless steel, aluminum, nickel, titanium, baked carbon, a surface treated material of copper or stainless steel with carbon, nickel, titanium, silver, an aluminum-cadmium alloy, etc. may be used. Also, to increase the adhesiveness of the anode active material, minute embossing may be formed on the surface of the anode current collector as the cathode current collector. The anode current collector may have various shapes such as a film, a sheet, a foil, a net, a porous body, a foamed body, a non-woven fabric, etc.

[Anode Active Material]

The anode active material may include, for example, carbon such as non-graphitizable carbon, graphite-based carbon, etc.; a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0 < x \leq 1$; $1 \leq y \leq 3$; $1 \leq z \leq 8$), etc.; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene, etc.; Li—Co—Ni-based material, etc.

Separator

The separator according to the present invention and the radical cells formed by simply stacking independent of a folding process or a roll process are simply stacked. Particularly, the attachment of the separator with the cathode and the anode in a laminator is conducted by melting the separator sheet by heat for attaching and fixing. The stable interface contact between the electrode and the separator sheet may be possible through maintaining a pressure.

The separator sheet or the separator interposed between the cathode and the anode of the cell may be manufactured by using a material having insulating properties and a porous structure for the movement of ions, and the material thereof is not specifically limited. The separator and the separator sheet may be formed by using the same material or not.

The separator or the separator sheet may be formed into a thin film having high ion transmittance, high mechanical strength and insulating properties. The separator or the separator sheet may have the pore diameter of about 0.01 to 10 μm, and the thickness of the separator or the separator sheet may be generally about 5 to 300 μm. For example, the separator or the separator sheet may be formed by using an olefin-based polymer such as chemical-resistant and hydrophobic polypropylene, etc; a sheet or a non-woven fabric formed by using a glass fiber or polyethylene, etc. When a solid electrolyte such as a polymer is used as an electrolyte, the solid electrolyte may also be used as the separator. For example, a polyethylene film, a polypropylene film, or a multi-layered film obtained by combining the films, or a polymer film for a polymer electrolyte or a gel-type polymer electrolyte such as polyvinylidene fluoride, polyethylene oxide, or polyvinylidene fluoride polyacrylonitrile, hexafluoropropylene copolymer, etc. may be used.

The separator preferably has an attaching function by a thermal welding to form a unit cell, and the separator sheet need not to have such function but preferably has the attaching function.

The electrode assembly according to the present invention may be applied in an electrochemical cell producing electricity by the electrochemical reaction of a cathode and an anode. Typical examples of the electrochemical cell include a super capacitor, an ultra capacitor, a secondary battery, a fuel battery, various sensors, an apparatus for electrolysis, an electrochemical reactor, and the like. Among these, the secondary battery is particularly preferably.

The secondary battery has a structure in which a charge and discharge type electrode assembly is impregnated in an electrolyte containing ions and equipped in a battery case. In a preferred embodiment, the secondary battery may be a lithium secondary battery.

Recently, the lithium secondary battery receives much attention as a power source of a large size device as well as a small size mobile device. When applying in these fields, the secondary battery is necessary to be lightweight. As one method of decreasing the weight of the secondary battery, a structure in which an electrode assembly is equipped in a pouch type case of an aluminum laminate sheet may be preferable. Such a lithium secondary battery is known in the art, and the explanation thereon will be omitted in the present application.

As described above, when the secondary battery is used as the power source of a medium and large size device, a secondary battery having good lifetime properties and having a structure capable of being manufactured with mass production at low manufacturing costs is preferable. From this point of view, the secondary battery including the electrode assembly of the present invention may be preferably used in a medium and large size battery module including the secondary battery as a unit battery.

A battery pack including the battery module including a plurality of secondary batteries may be used as a power source in a medium and large size device selected from the group consisting of a power tool; an electric vehicle selected from the group consisting of an electric vehicle (EV), a hybrid electric vehicle (HEV), and a plug-in hybrid electric vehicle (PHEV); an E-bike; an E-scooter; an electric golf cart; an electric truck; and an electric commercial vehicle.

The medium and large size battery module includes a plurality of unit batteries connected in series or in series/parallel to provide high output and high capacity, and the explanation thereon is known in the art and will be omitted in the present application.

While the present invention has been shown and described in connection with the exemplary embodiments, it will be apparent to those skilled in the art that modifications and variations can be made without departing from the spirit and scope of the invention as defined by the appended claims.

What is claimed is:

1. An electrode assembly, comprising:
   at least one first unit cell obtained by stacking a first electrode, a separator, a second electrode, a separator and a first electrode one by one; and
   at least one second unit cell obtained by stacking a second electrode, a separator, a first electrode, a separator and a second electrode one by one,
   the first unit cell and the second unit cell being alternately and repeatedly disposed between a separator sheet folded in zigzags,
   wherein a plurality of the first unit cells is prepared and is divided into at least two groups having different sizes, and a plurality of the second unit cells is prepared and is divided into at least two groups having different sizes, and
   the separator sheet has different folded lengths in zigzags according to the size of the first unit cell and the size of the second unit cell.

2. The electrode assembly of claim 1, wherein the first unit cell and the second unit cell have a combined structure of the electrode and the separator into one body by heat and pressure.

3. The electrode assembly of claim 1, wherein heat and pressure are applied to the electrode assembly.

4. The electrode assembly of claim 1, wherein an active material is coated only on one side of the first electrode or the second electrode, facing an inner portion of the electrode assembly, the first electrode and the second electrode being disposed respectively at the outermost portions of both terminal portions of the electrode assembly.

5. The electrode assembly of claim 1, wherein the first unit cell further comprises at least one first additional unit cell obtained by stacking a separator, a second electrode, a separator and a first electrode, and
   the second unit cell further comprises at least one second additional unit cell obtained by stacking a separator, a first electrode, a separator and a second electrode.

6. The electrode assembly of claim 1, wherein the first unit cell and the second unit cell are alternately disposed according to the size with the separator sheet therebetween.

7. The electrode assembly of claim 6, wherein the electrode assembly has a step shape.

8. The electrode assembly of claim 1, wherein at least one of the plurality of the first unit cells further comprises a first additional unit cell obtained by stacking a separator, a second electrode, a separator and a first electrode,
  at least one of the plurality of the second unit cells further comprises a second additional unit cell obtained by stacking a separator, a first electrode, a separator and a second electrode, and
  the separator sheet has different folded heights in zigzags according to the height of the first unit cell and the height of the second unit cell.

9. The electrode assembly of claim 8, wherein the first unit cell and the second unit cell are alternately disposed according to the height with the separator sheet therebetween.

10. A manufacturing method of an electrode assembly, the method comprising:
  forming at least one first unit cell obtained by stacking a first electrode, a separator, a second electrode, a separator and a first electrode one by one;
  forming at least one second unit cell obtained by stacking a second electrode, a separator, a first electrode, a separator and a second electrode one by one; and
  forming the electrode assembly by alternately and repeatedly disposing the first unit cell and the second unit cell between a separator sheet folded in zigzags,
  wherein a plurality of the first unit cells is prepared and is divided into at least two groups having different sizes, and a plurality of the second unit cells is prepared and is divided into at least two groups having different sizes, and
  the separator sheet has different folded lengths in zigzags according to the size of the first unit cell and the size of the second unit cell.

11. The manufacturing method of an electrode assembly of claim 10, wherein the forming of the electrode assembly comprises:
  disposing at least one of the first unit cells with a certain distance on one side of the separator sheet, and disposing at least one of the second unit cells with the certain distance on the other side of the separator sheet, the second unit cell being positioned between the first unit cells; and
  folding the separator sheet in zigzags.

12. The manufacturing method of an electrode assembly of claim 10, wherein the forming of the electrode assembly comprises:
  disposing at least one of the first unit cells with a certain distance on one side of the separator sheet, and disposing at least one of the second unit cells with the certain distance on the other side of the separator sheet, the second unit cell being positioned at the same position as the first unit cell; and
  folding the separator sheet in zigzags.

13. The manufacturing method of an electrode assembly of claim 10, further comprising pressurizing and compressing both folded portions of the separator sheet.

14. The manufacturing method of an electrode assembly of claim 13, wherein the first unit cell and the second unit cell are alternately disposed according to the size with the separator sheet therebetween.

15. The manufacturing method of an electrode assembly of claim 14, wherein the electrode assembly manufactured by the manufacturing method of the electrode assembly has a step shape.

16. The manufacturing method of an electrode assembly of claim 10, wherein at least one of the plurality of the first unit cells further comprises a first additional unit cell obtained by stacking a separator, a second electrode, a separator and a first electrode,
  at least one of the plurality of the second unit cells further comprises a second additional unit cell obtained by stacking a separator, a first electrode, a separator and a second electrode, and
  folded heights of the separator sheet in zigzags are different according to the height of the first unit cell and the height of the second unit cell in the forming of the electrode assembly.

17. The manufacturing method of an electrode assembly of claim 16, wherein the first unit cell and the second unit cell are alternately disposed according to the height with the separator sheet therebetween.

* * * * *